(12) United States Patent
Fukasawa

(10) Patent No.: US 8,411,330 B2
(45) Date of Patent: Apr. 2, 2013

(54) IMAGE PROCESSING SYSTEM, CONTROL METHOD, RECORDING MEDIUM, AND IMAGE SUPPLYING APPARATUS

(75) Inventor: Nobuaki Fukasawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1012 days.

(21) Appl. No.: 12/392,787

(22) Filed: Feb. 25, 2009

(65) Prior Publication Data

US 2009/0213412 A1    Aug. 27, 2009

(30) Foreign Application Priority Data

Feb. 26, 2008    (JP) .................. 2008-045099

(51) Int. Cl.
*H04N 1/04* (2006.01)
(52) U.S. Cl. ........ 358/448; 358/1.15; 358/474; 358/505
(58) Field of Classification Search .............. 358/448, 358/1.15, 474, 505
See application file for complete search history.

(56) References Cited

FOREIGN PATENT DOCUMENTS

| JP | 09-223061 | * | 8/1997 |
| JP | 2004-186810 A | | 7/2004 |
| JP | 2004-287912 A | | 10/2004 |
| JP | 2006-252231 A | | 9/2006 |

OTHER PUBLICATIONS

Japanese Office Action issued on May 18, 2012 for Japanese Patent Application No. 2008-045099.

* cited by examiner

*Primary Examiner* — Houshang Safaipour
(74) *Attorney, Agent, or Firm* — Carter, DeLuca, Farrell & Schmidt LLP

(57) ABSTRACT

An image processing system is provided in which an image supplying apparatus is connected to a plurality of image processing apparatuses via a network, where at least one image processing apparatus executes processing requested by a user for image data supplied from the image supplying apparatus. The image supplying apparatus includes a determination unit configured to determine whether the image data requests a security condition, a decision unit configured to decide on the security condition, a search unit configured to search the plurality of image processing apparatuses for an image processing apparatus which is capable of executing the processing requested by the user and satisfies the security condition, a display unit configured to display the image processing apparatus detected by the search unit so as to allow the user to select the image processing apparatus, and a transmission unit configured to transmit the image data to the image processing apparatus.

12 Claims, 11 Drawing Sheets

FIG. 3

TBL

| SECURITY CONDITIONS / IMAGE PROCESSING | ENCRYPTION OF COMMUNICATION CHANNEL | PAUSE PRINTING FUNCTION | SECURE BOX FUNCTION | ENCRYPTION OF HDD | WELL-PROTECTED IMAGE PROCESSING APPARATUS |
|---|---|---|---|---|---|
| PRINT PROCESSING | NECESSARY | NECESSARY | UNNECESSARY | UNNECESSARY | UNNECESSARY |
| SAVE PROCESSING | NECESSARY | UNNECESSARY | NECESSARY | NECESSARY | NECESSARY |
| FAX PROCESSING | NECESSARY | UNNECESSARY | UNNECESSARY | UNNECESSARY | NECESSARY |

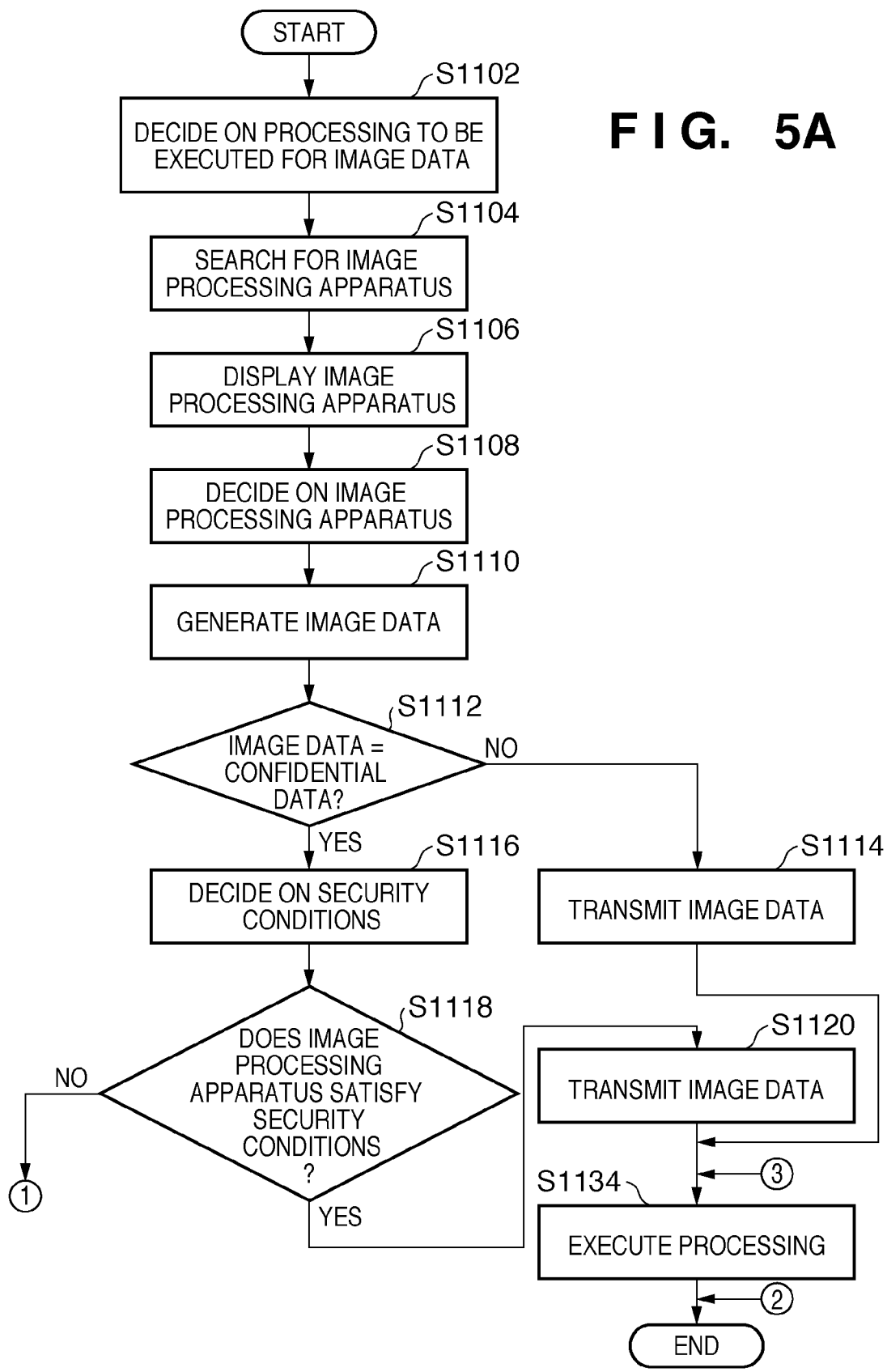

IMAGE PROCESSING SYSTEM, CONTROL METHOD, RECORDING MEDIUM, AND IMAGE SUPPLYING APPARATUS

BACKGROUND OF THE INVENTION

1. Field of the Invention

The present invention generally relates to an image processing system, control method, recording medium, and image supplying apparatus.

2. Description of the Related Art

Currently, predetermined information can be embedded in a print document by using a copy-forgery-inhibited pattern technique, or the like. For example, a print document (to be referred to as a "confidential document" hereinafter) exists containing information which inhibits free copying.

To handle a confidential document, an image processing apparatus (e.g., a so-called copying machine) has been proposed that has a specific function in addition to the usual image reading function and image forming function. When reading an image, the image processing apparatus determines whether the target document is a confidential document. If the target document is a confidential document, the image processing apparatus permits the operation (e.g., executes processing) after the user is authenticated. When saving read data of a confidential document, the image processing apparatus saves the data in an area which requires user authentication, thereby ensuring security. User authentication generally uses a password or IC card.

This technique is proposed in Japanese Patent Laid-Open No. 2004-186810.

However, along with recent advances in networking of image reading apparatuses and image processing apparatuses, the security of (e.g., read data of) a confidential document may need to be ensured in all the image reading apparatuses, image processing apparatuses, and network. When reading a confidential document by an image reading apparatus and processing it by an image processing apparatus on a network, the user may search for and select an image processing apparatus in consideration for such security.

More specifically, when reading a confidential document by an image reading apparatus and printing it by an image processing apparatus on a network, the user may search for and select an image processing apparatus which satisfies security conditions (1) to (4):

(1) it can encrypt (i.e., secure) a network (i.e., communication channel) between an image reading apparatus and itself;

(2) it has a pause printing function;

(3) it has a function for reliably erasing read data of a confidential document after print processing; and (4) it is well-protected (for example, installed in a company or office).

The pause printing function is to temporarily save print data transmitted from an image reading apparatus in an image processing apparatus, and continue printing the print data after user authentication in the image processing apparatus. The pause printing function prevents a third party other than the user from viewing a printed material.

When reading a confidential document by an image reading apparatus and saving it in an image processing apparatus on a network, the user may search for and select an image processing apparatus which satisfies security conditions (1) to (3):

(1) it can encrypt (i.e., secure) a network (e.g., communication channel) between an image reading apparatus and itself;

(2) it has a save area which requires user authentication based on a password or IC card; and (3) it is well-protected (for example, installed in a company or office).

In this manner, even a single confidential document may request different security conditions of an image processing apparatus depending on the processing the user wants to perform. Since image processing apparatuses on a network have different security functions, the user may search for and select, in accordance with processing he wants to perform, an image processing apparatus capable of satisfying security conditions, and set settings for satisfying the security conditions. According to a conventional technique, the user manually executes this operation, so that human error may readily occur, and a confidential document may be likely to leak.

For example, if the user transmits read data of a confidential document via an unsecured network (i.e., communication channel), a third party may eavesdrop on the confidential document via the network. If the user selects an image processing apparatus having no pause printing function and executes print processing, a third party other than the user may view the confidential document. If the user selects a poorly protected image processing apparatus (e.g., installed outside a company) and executes print processing, a confidential document may leak from the company.

SUMMARY OF THE INVENTION

According to one aspect of the present invention, there is provided an image processing system in which an image supplying apparatus is connected to a plurality of image processing apparatuses via a network, and at least one image processing apparatus among the plurality of image processing apparatuses executes processing requested by a user for image data supplied from the image supplying apparatus. The image supplying apparatus includes a determination unit configured to determine whether the image data requests a security condition of the image processing apparatus, a decision unit configured to decide on the security condition in accordance with the processing requested by the user when the determination unit determines that the image data requests the security condition, a search unit configured to search the plurality of image processing apparatuses connected to the network for an image processing apparatus which is capable of executing the processing requested by the user and satisfies the security condition decided on by the decision unit, a display unit configured to display the image processing apparatus detected by the search unit so as to allow the user to select the image processing apparatus, and a transmission unit configured to transmit the image data to the image processing apparatus which is displayed on the display unit and is selected by the user.

According to the another aspect of the present invention, there is provided a control method for an image processing system in which an image supplying apparatus is connected to a plurality of image processing apparatuses via a network, and at least one image processing apparatus among the plurality of image processing apparatuses executes processing requested by a user for image data supplied from the image supplying apparatus. The method includes searching the plurality of image processing apparatuses connected to the network for an image processing apparatus that is capable of executing the processing requested by the user, deciding on, from among the image processing apparatuses detected in the search step, an image processing apparatus for executing the processing requested by the user, determining, after deciding on the image processing apparatus for executing the processing requested by the user, whether the image data requests a security condition of the image processing apparatus, deciding on the security condition in accordance with the processing requested by the user when the image data is determined to request the security condition, determining whether the image processing apparatus decided on for executing the processing requested by the user satisfies the security condition, and transmitting the image data to the image processing apparatus decided on for executing the processing requested by the user when the image processing apparatus is determined to satisfy the security condition.

According to yet another aspect of the present invention, there is provided an image supplying apparatus which is connected to a plurality of image processing apparatuses via a network, and causes at least one image processing apparatus among the plurality of image processing apparatuses to execute processing requested by a user for supplied image data. The image supplying apparatus includes a determination unit configured to determine whether the image data requests a security condition of the image processing apparatus, a decision unit configured to decide on the security condition in accordance with the processing requested by the user when the determination unit determines that the image data requests the security condition, a search unit configured to search the plurality of image processing apparatuses connected to the network for an image processing apparatus that is capable of executing the processing requested by the user and satisfies the security condition decided on by the decision unit, a display unit configured to display the image processing apparatus detected by the search unit so as to allow the user to select the image processing apparatus, and a transmission unit configured to transmit the image data to the image processing apparatus which is displayed on the display unit and is selected by the user.

Further features of the present invention will become apparent from the following description of exemplary embodiments with reference to the attached drawings.

BRIEF DESCRIPTION OF THE DRAWINGS

FIG. 3 is a table showing an example of a table representing the relationship between processing executed for image data and security conditions for the processing.

FIGS. 5A and 5B are flowcharts for explaining another example of the operation of an embodiment of an image processing system as shown in FIG. 1.

DESCRIPTION OF THE EMBODIMENT

Figure 1:
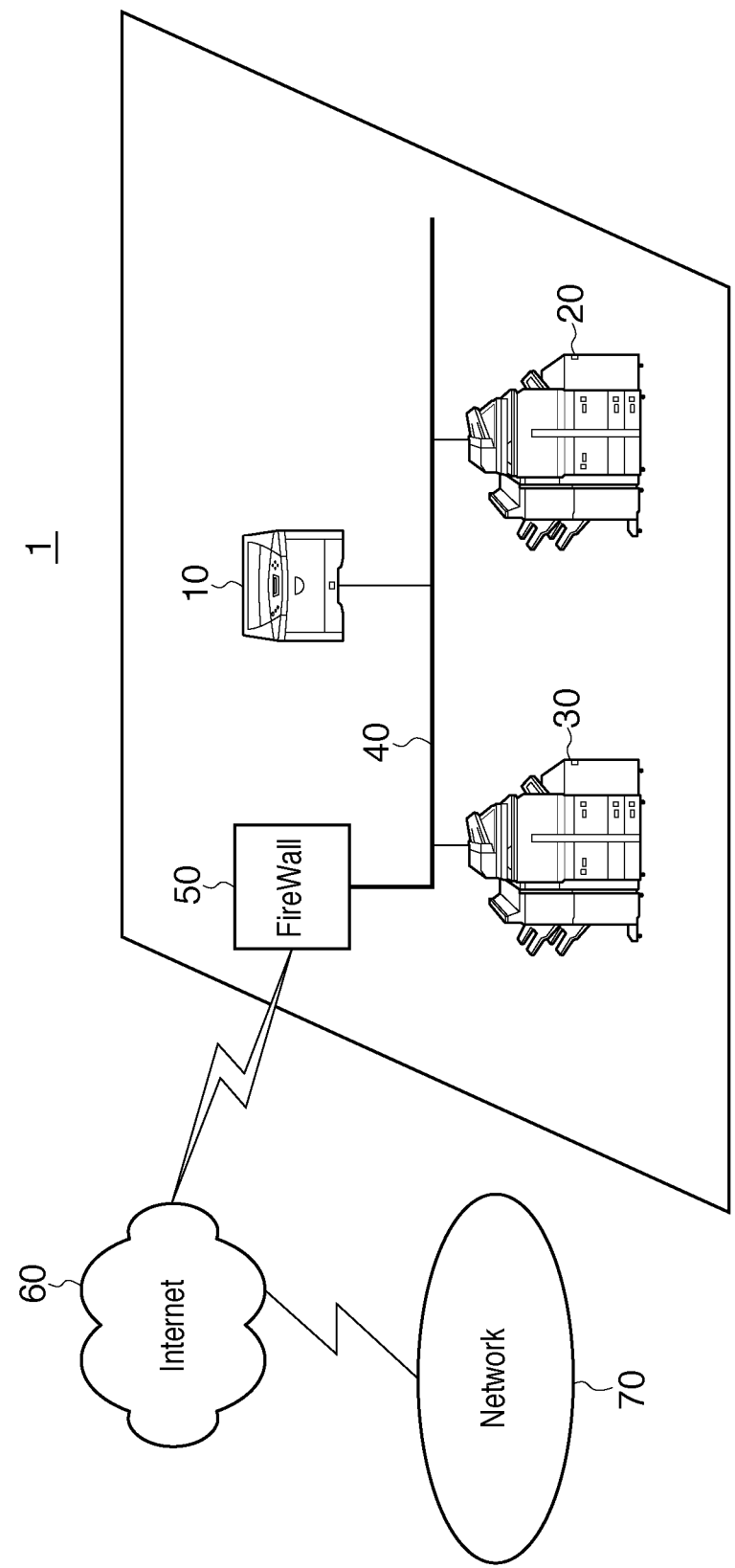
FIG. 1 is a schematic view showing an embodiment of an image processing apparatus as one aspect of the present invention.

An embodiment of the present invention will be described below with reference to the accompanying drawings. The same reference numerals denote the same parts throughout the drawings, and thus a repetitive description thereof will be omitted.

FIG. 1 is a schematic view showing the configuration of an image processing system 1, according to one aspect of the present invention. In the image processing system 1, an image supplying apparatus is connected to a plurality of image processing apparatuses via a network. An image processing apparatus on the network executes processing requested by the user for image data supplied from the image supplying apparatus.

Referring to FIG. 1, the image processing system 1 according to this embodiment includes an SFP (Single Function Printer) 10, and MFPs (Multi Function Printers) 20 and 30. The image processing system 1 also includes a LAN 40 which connects the SFP 10 and the MFPs 20 and 30, and a fire wall 50 which connects the LAN 40 to the Internet 60. The LAN 40 is connected to another network 70 via the fire wall 50 and Internet 60.

As image processing, the SFP 10 only a function for printing of printing image data received via the LAN 40 on printing paper. For image processing, the MFPs 20 and 30 have various functions such as an image reading function for reading a print document to generate image data, a printing function for printing image data on printing paper, a save function for saving image data, and a transmission function for transmitting image data via the LAN 40.

In the image processing system 1 according to the embodiment, the MFP 20 functions as an image supplying apparatus which reads a print document to generate image data, and can transmit (e.g., supply) the image data to one or more of the SFP 10 or MFP 30. The SFP 10 and MFP 30 may function as image processing apparatuses which execute processing (e.g., image processing) requested by the user for image data received from the MFP 20. An MFP which supplies, to an image processing apparatus via a network, image data obtained by reading an image on a document (e.g., print document) by a reader will be exemplified as the image supplying apparatus. However, the present invention is not limited to this, and various other types of image supplying apparatuses can also be employed including one which supplies for example, to an image processing apparatus on a network via a device driver or the like, data created by an application running on a personal computer, or the like.

Figure 2:
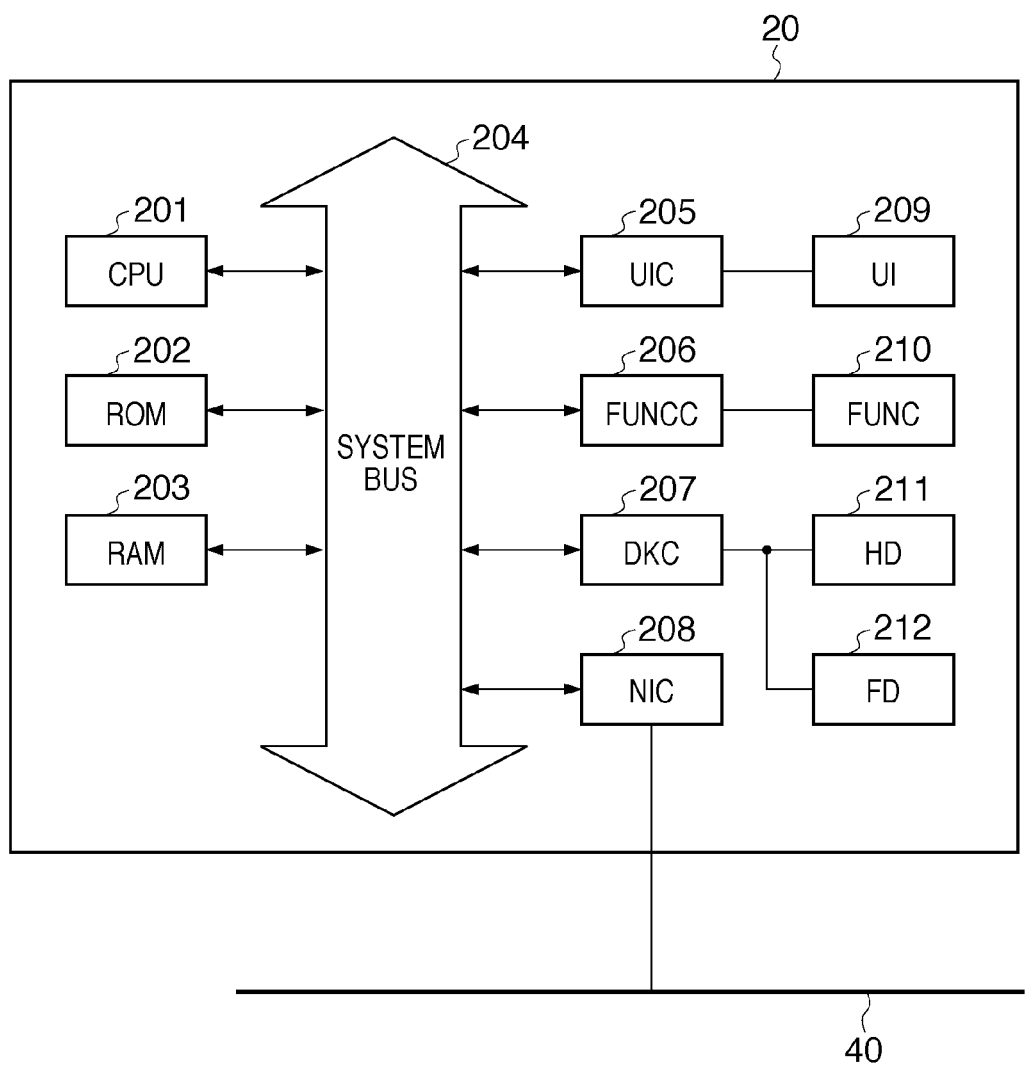
FIG. 2 is a schematic block diagram showing an example of the internal arrangement of an MFP in an embodiment of an image processing system as shown in FIG. 1.

The internal arrangement of an embodiment of the MFP 20 will be explained with reference to FIG. 2. The SFP 10 and MFP 30 may have the same general internal arrangement as that of the MFP 20, and a thus detailed description thereof will not be repeated. FIG. 2 is a schematic block diagram showing an example of the internal arrangement of the embodiment of the MFP 20.

As shown in the example of FIG. 2, the embodiment of the MFP 20 includes a CPU 201, ROM 202, RAM 203, and system bus 204. The MFP 20 according to this embodiment also includes a user interface controller (UIC) 205, function controller (FUNCC) 206, disk controller (DKC) 207, and network interface card (NIC) 208. Further, the MFP 20 in this embodiment includes a user interface (UI) 209, function (FUNC) 210, hard disk (HD) 211, and flexible disk (FD) 212.

The CPU 201 may execute a variety of programs stored in one or more of the ROM 202 or HD 211, and/or may execute a variety of programs supplied from the FD 212. The CPU 201 can control all building components connected to the system bus 204.

The RAM 203 may function as one or more of a main memory, work area, and the like, for the CPU 201.

The UIC 205 can control a display (for example, one or more of the operating state of the MFP 20, the operation window of the MFP 20, and a warning to the user) on the UI 209, and an instruction (for example, setting and/or selection of image processing) input from the UI 209.

The FUNCC 206 can implement and control the FUNC 210 including functions (i.e., at least one of the above-mentioned image reading function, printing function, save function, and transmission function), which are specific to the MFP 20. For example, when the MFP 20 prints in monochrome, the FUNCC 206 may include a monochrome print engine controller, and the FUNC 210 may include a monochrome print engine. By the same token, when the MFP 20 prints in color, the FUNCC 206 may include a color print engine controller, and the FUNC 210 may include a color print engine.

The DKC 207 can control access to one or more of the HD 211 and FD 212 serving as storage areas for implementing a function of storing a boot program, the operating (control) program of the image processing system 1, and various applications, and/or a Box function (save function) of storing image data.

The NIC 208 can enable transmission/reception (i.e., two-way communication) of data (e.g., image data) via the LAN 40 to/from devices (including another network device) connected to the LAN 40.

In one embodiment, the components in the embodiment of the MFP 20 shown in FIG. 2 may function as one or more of a determination unit, decision unit, search unit, display unit, transmission unit, storage unit, and the like, either independently or in cooperation with each other, in the image processing system 1.

For example, the CPU 201 may function as a determination unit which determines whether image data generated by reading a print document is confidential data. The confidential data is data that requests security conditions of the SFP 10 or MFP 30 for executing the processing requested by the user for image data generated by the MFP 20. For example, the confidential data may be image data of a confidential document. As another example, when reading a print document, the CPU 201 can extract a copy-forgery-inhibited pattern that is embedded in the print document. If the copy-forgery-inhibited pattern contains information representing a confidential document, the CPU 201 determines that the read data is confidential data. The copy-forgery-inhibited pattern may be, for example, an image that is printed invisibly on an original document and that appears upon scanning the document by a scanner. The way the CPU 201 can determine whether data requests security conditions is not limited only to this example, and instead the CPU 201 may also determine whether the user designates the use of security conditions or whether a document contains a specific keyword. The CPU 201 can also determine whether an image processing apparatus for executing image processing satisfies security conditions.

The CPU 201 may also function as a decision unit which, when image data generated by reading a print document corresponds to confidential data, decides on security conditions for the SFP 10 or MFP 30 in accordance with processing requested by the user. For example, the CPU 201 may decide on security conditions based on processing requested by the user and a table (see, e.g., FIG. 3) stored in the ROM 202 or HD 211 (to be described later). The CPU 201 may also be capable of deciding on an image processing apparatus for executing the processing requested by the user.

Furthermore, the CPU 201 may function as a search unit that searches a plurality of image processing apparatuses (e.g., the SFP 10 and MFP 30 according to one embodiment) connected to the LAN 40 to find and detect an image processing apparatus that is capable of (i.e., has a function for) executing the processing requested by the user that also satisfies the previously decided security conditions. When image data is not confidential data, the CPU 201 may be capable of searching a plurality of image processing apparatuses connected to the LAN 40 to detect an image processing apparatus that is capable of executing the processing requested by the user. Regardless of security conditions, the CPU 201 may also search a plurality of image processing apparatuses connected to the LAN 40 to detect an image processing apparatus capable of executing the processing requested by the user.

The UI 209 may function as a display unit, which is formed from a touch panel or the like, and displays the image processing apparatus detected by the CPU 201 (i.e., the image processing apparatus that is capable of executing the processing requested by the user, and that satisfies the previously decided security conditions), so that the user can select the image processing apparatus. When the CPU 201 cannot detect an image processing apparatus that is capable of executing the processing requested by the user and that satisfies the previously decided security conditions, the UI 209 may display a message to this effect.

The NIC 208 may function as a transmission unit that transmits image data to an image processing apparatus that is displayed on the UI 209 and that has been selected by the user.

The ROM 202 and HD 211 may function as a storage unit that stores a table representing the relationship between processing executed for image data generated by the MFP 20 and security conditions used for the processing.

FIG. 3 is a table showing an example of a table TBL representing the relationship between processing executed for image data and security conditions used for the processing. The table TBL may generally be set by the user in advance, but may also be temporarily changed in executing processing. The image processes and security conditions in the table TBL shown in FIG. 3 are merely examples, and suitable image processes and security conditions are not limited thereto.

Referring to FIG. 3, when executing print processing of image data, security conditions that may be provided may be at least one of an encryption of the communication channel (e.g., the LAN 40, according to one embodiment), and the pause printing function. When executing save processing on image data, security conditions that may be provided may be at least one of encryption of the communication channel, the secure BOX function, encryption of the hard disk (HD), and a well-protected image processing apparatus. The secure BOX function may allow an operation to a storage area for storing image data only when the user is authenticated by a password or IC card. Similarly, when executing FAX processing of image data, security conditions that may be provided may be encryption of the communication channel and a well-protected image processing apparatus. A well-protected image processing apparatus may be decided on in accordance with the relationship with at least one of a user who designates transmission of image data, and a transmitting image supplying apparatus. In other words, a well-protected image processing apparatus may be, for example, an image processing apparatus belonging to a group that is the same as that to which the user belongs, or an image processing apparatus installed in the same segment as that of a transmitting image supplying apparatus.

Figure 4:
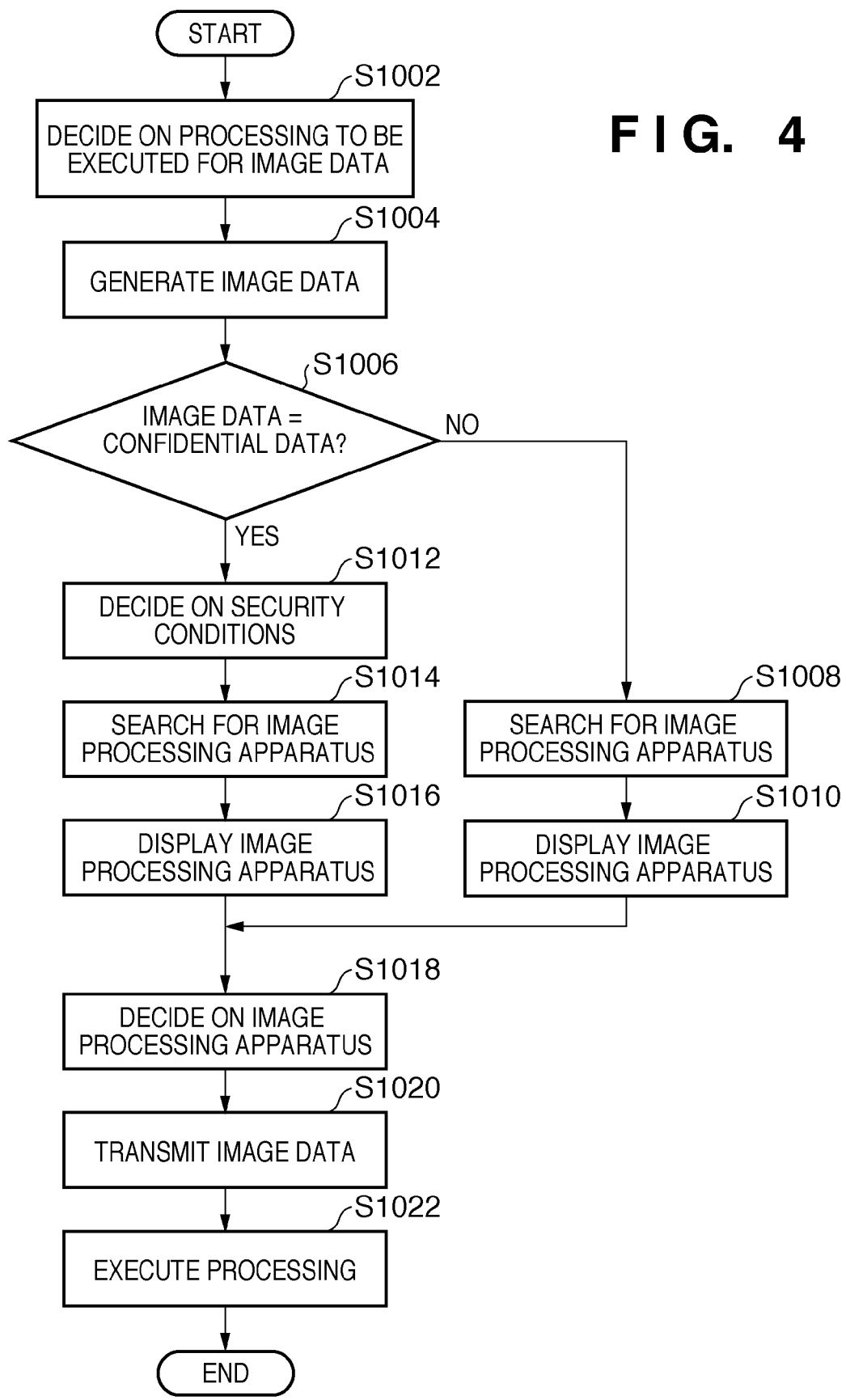
FIG. 4 is a flowchart for explaining an example of the operation of an embodiment of an image processing system as shown in FIG. 1.
Figure 5B:
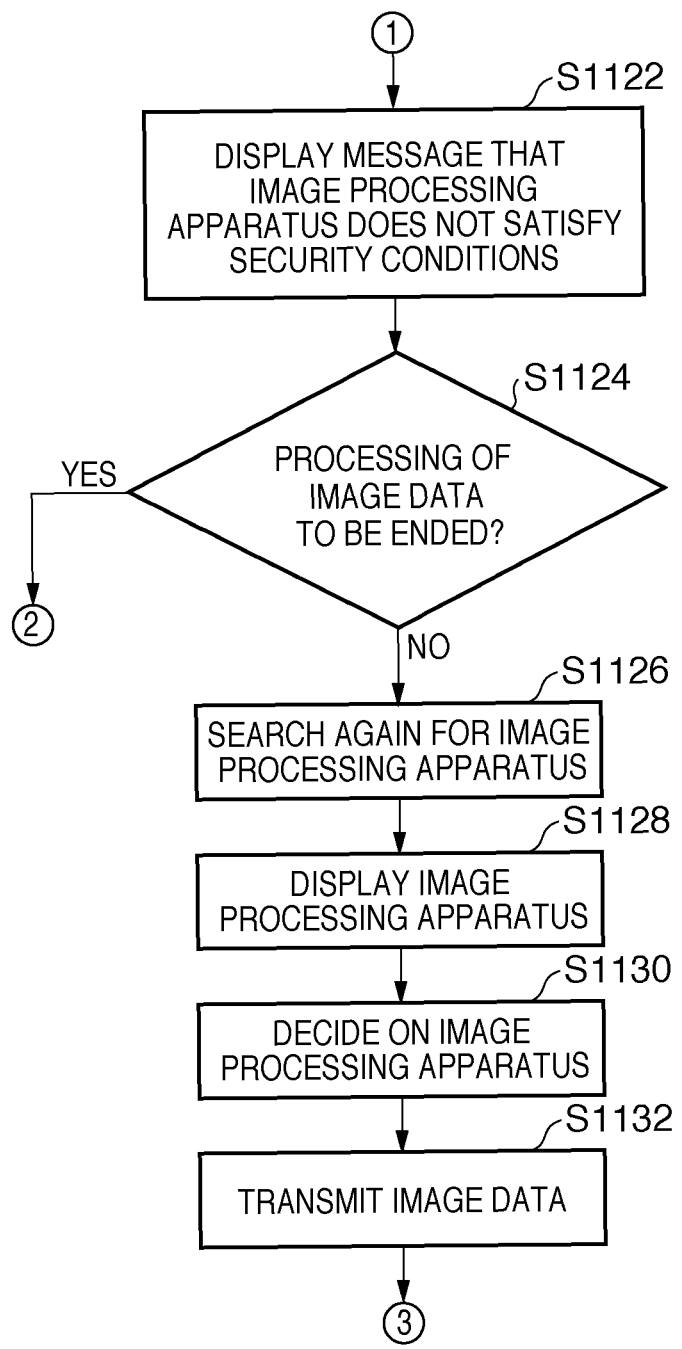

The overall operation of an embodiment of the image processing system 1 will be explained. FIG. 4 is a flowchart for explaining an example of the operation of the embodiment of the image processing system 1. FIGS. 5A and 5B are flowcharts for explaining another example of the operation of the embodiment of the image processing system 1.

A case where security conditions for processing requested by the user are decided on, and then an image processing apparatus for executing the processing of image data generated by the MFP 20 is selected, will be exemplified with reference to FIG. 4.

In step S1002, the processing (i.e., processing requested by the user) to be executed for image data generated by the MFP 20 is decided on. For example, the MFP 20 may display, on the UI 209, processes (for example, one or more of print processing, save processing, and FAX processing) to be executed on image data, so that the user can select one of them. The user selects one of the processes displayed on the UI 209, thereby deciding on the processing to be executed for image data.

In step S1004, the MFP 20 reads a print document to generate image data.

In step S1006, the MFP 20 determines whether the image data generated in step S1004 is confidential data (i.e., the image data requests security conditions). For example, as described above, when reading a print document, the MFP 20 may extract a copy-forgery-inhibited pattern that is embedded in the print document, and determines in accordance with it whether the image data is confidential data. The MFP 20 may also accept an instruction (e.g., instruction representing whether image data is or is not confidential data) from the user via the UI 209, and determine in accordance with the instruction whether the image data is confidential data.

If the MFP 20 determines in step S1006 that the image data is not confidential data (NO in step S1006), processing proceeds to step S1008, where it searches for an image processing apparatus that is capable of executing the processing (i.e., the processing requested by the user) that was decided on in step S1002. For example, a plurality of image processing apparatuses (e.g., the SFP 10 and MFP 30, according to one the embodiment) on the network in the image processing system 1 may be searched for an image processing apparatus that is capable of executing the processing that was decided on in step S1002.

In step S1010, the MFP 20 displays image processing apparatuses that were detected in step S1008 on the UI 209, so that the user can select one of them, and processing proceeds to step S1018. If the MFP 20 cannot detect an image processing apparatus that is capable of executing the processing decided on in step S1002, it may also display a message to this effect.

If the MFP 20 determines in step S1006 that the image data is confidential data (YES in step S1006), processing proceeds to step S1012 where it decides on security conditions to be used for the processing previously decided on in step S1002. For example, as described above, the MFP 20 may look up the table TBL stored in the ROM 202 or HD 211, to decide on security conditions requested of an image processing apparatus for the processing decided on in step S1002.

In step S1014, the MFP 20 searches for an image processing apparatus that is capable of executing the processing previously decided on in step S1002, and that also satisfies the security conditions decided on in step S1012. For example, a plurality of image processing apparatuses on the network in the image processing system 1 may be searched for an image processing apparatus that is capable of executing the processing decided on in step S1002, and that also satisfies the security conditions decided on in step S1012.

In step S1016, the MFP 20 displays the image processing apparatuses detected in step S1014 on the UI 209, so that the user can select one of them. If the MFP 20 cannot detect an image processing apparatus that is capable of executing the processing decided on in step S1002, and that also satisfies the security conditions decided on in step S1012, it may also display a message to this effect.

In step S1018, the MFP 20 decides on, from image processing apparatuses displayed in either step S1010 or S1016, an image processing apparatus for executing the processing decided on in step S1002 for the image data generated in step S1004. More specifically, the user selects one of image processing apparatuses as displayed in either step S1010 or S1016, thereby deciding on an image processing apparatus for executing the processing on the image data. At this time, if the security conditions decided on in step S1012 are associated with a function set in the image processing apparatus, the function may be set in the image processing apparatus.

In step S1020, the MFP 20 transmits the image data generated in step S1004 to the image processing apparatus decided on in step S1018.

In step S1022, the image processing apparatus decided on in step S1018 executes the processing decided on in step S1002 for the image data transmitted from the MFP 20.

In the embodiment of the image processing system 1, the MFP 20 may be capable of automatically deciding security conditions which change in accordance with the processing requested by the user, and search for an image processing apparatus which satisfies the security conditions. The user selects at least one of detected image processing apparatuses, and the selected image processing apparatus executes the processing of the image data. In this fashion, the image processing system 1 can improve usability and reduce the likelihood and even prevent leakage of a confidential document due to a human error.

An example of a case where an image processing apparatus for executing processing of image data generated by the MFP 20 is selected, and then security conditions for processing requested by the user are decided on, will be exemplified with reference to FIGS. 5A and 5B.

In step S1102, the processing (i.e., the processing requested by the user) to be executed for image data generated by the MFP 20 is decided on. For example, the MFP 20 may display, on the UI 209, processes (for example, at least one of print processing, save processing, and FAX processing) to be executed on the image data, so that the user can select one of them. The user selects one of the processes displayed on the UI 209, thereby deciding on processing to be executed on image data.

In step S1104, the MFP 20 searches for an image processing apparatus that is capable of executing the processing (i.e., processing requested by the user) previously decided on in step S1102. For example, a plurality of image processing apparatuses (e.g., the SFP 10 and MFP 30 in one embodiment) on the network in the image processing system 1 may be searched to detect an image processing apparatus that is capable of executing the processing previously decided on in step S1102.

In step S1106, the MFP 20 displays image processing apparatuses detected in step S1104 on the UI 209, so that the user can select one or more of them. If the MFP 20 cannot detect an image processing apparatus that is capable of executing the processing decided in step S1102, it may also display a message to this effect.

In step S1108, the MFP 20 decides on, from among the image processing apparatuses displayed in step S1106, an image processing apparatus for executing the processing previously decided in step S1102 for the image data generated by the MFP 20 (e.g., a first decision step). For example, the user may select one of image processing apparatuses displayed in step S1106, thereby deciding on an image processing apparatus for executing the processing of the image data.

In step S1110, the MFP 20 reads a print document to generate image data.

In step S1112 (e.g., first determination step), the MFP 20 determines whether the image data generated in step S1110 is confidential data (i.e., whether the image data requests security conditions). For example, as described above, when reading a print document, the MFP 20 may extract a copy-forgery-inhibited pattern embedded in the print document, and may determine in accordance with it whether the image data is confidential data. The MFP 20 may also accept an instruction (e.g., instruction representing whether the image data is or is not confidential data) from the user via the UI 209, and may determine in accordance with the instruction whether the image data is confidential data.

If the MFP 20 determines in step S1112 that the image data is not confidential data (NO in step S1112), processing proceeds to step S1114, where it transmits the image data generated in step S1110 to the image processing apparatus decided on in step S1108. Processing then proceeds to step S1134.

If the MFP 20 determines in step S1112 that the image data is confidential data (YES in step S1112), processing proceeds to step S1116 where it decides on (e.g., second decision step) security conditions to be used for the processing previously decided on in step S1102. For example, as described above, the MFP 20 may look up the table TBL stored in the ROM 202 or HD 211 to decide security conditions requested of the image processing apparatus for the processing decided on in step S1102.

In step S1118 (e.g., second determination step), the MFP 20 determines whether the image processing apparatus decided on in step S1108 satisfies the security conditions decided on in step S1116.

If the MFP 20 determines in step S1118 that the image processing apparatus satisfies the security conditions (YES in step S1118), processing proceeds to step S1120 where it transmits the image data generated in step S1110 to the image processing apparatus decided on in step S1108, and processing proceeds to step S1134.

If the MFP 20 determines in step S1118 that the image processing apparatus does not satisfy the security conditions (NO in step S1118), processing proceeds to step S1122 where it displays, on the UI 209, a message indicating that the image processing apparatus does not satisfy the security conditions, and processing proceeds to step S1124.

In step S1124, as shown in the example of FIG. 5B, the MFP 20 checks whether to end the processing of the image data generated by the MFP 20 (i.e., whether to continue the processing of the image data). For example, the MFP 20 may display on the UI 209 a message to prompt the user to select whether to end the processing of the image data. The user inputs, via the UI 209, the selection of whether to end the processing of the image data. From this input, the MFP 20 checks whether to end the processing of the image data.

If the MFP 20 determines in step S1124 to end the processing of the image data (YES in step S1124), the operation in the image processing system 1 ends. However, if the MFP 20 determines to continue the processing of the image data (NO in step S1124), processing advances to step S1126.

In step S1126, the MFP 20 searches again for an image processing apparatus that is capable of executing the processing previously decided on in step S1102, and that satisfies the security conditions decided on in step S1116. For example, a plurality of image processing apparatuses on the network in the image processing system 1 may be searched for an image processing apparatus that is capable of executing the processing previously decided on in step S1102, and that satisfies the security conditions decided on in step S1116.

In step S1128, the MFP 20 displays the image processing apparatuses detected again in step S1126 on the UI 209, so that the user can select one of them. If the MFP 20 cannot detect an image processing apparatus that is capable of executing the processing decided in step S1102, and that satisfies the security conditions decided on in step S1116, it may display a message to this effect.

In step S1130, the MFP 20 decides on, from among the image processing apparatuses displayed in step S1128, an image processing apparatus capable of executing the processing decided on in step S1102 for the image data generated in step S1110. For example, the user may select one of image processing apparatuses displayed in step S1128, thereby deciding on an image processing apparatus for executing the processing of the image data.

In step S1132, the MFP 20 transmits the image data generated in step S1110 to the image processing apparatus decided on in step S1130.

In step S1134, as shown in FIG. 5A, the image processing apparatus decided on in step S1108 or S1130 executes the processing decided on in step S1102, for the image data transmitted from the MFP 20, after which processing is ended.

In the embodiment of the image processing system 1, the MFP 20 may be capable of automatically deciding security conditions that change in accordance with the processing requested by the user, and searching for an image processing apparatus that satisfies the security conditions. The user can select at least one of detected image processing apparatuses, and the selected image processing apparatus executes the processing of the image data. If no image processing apparatus satisfies security conditions for processing of the image data, the operation in the image processing system 1 may be ended without executing the processing of the image data. Accordingly, the image processing system 1 can improve the usability and reduce the likelihood of leakage of a confidential document due to a human error.

Figure 6:
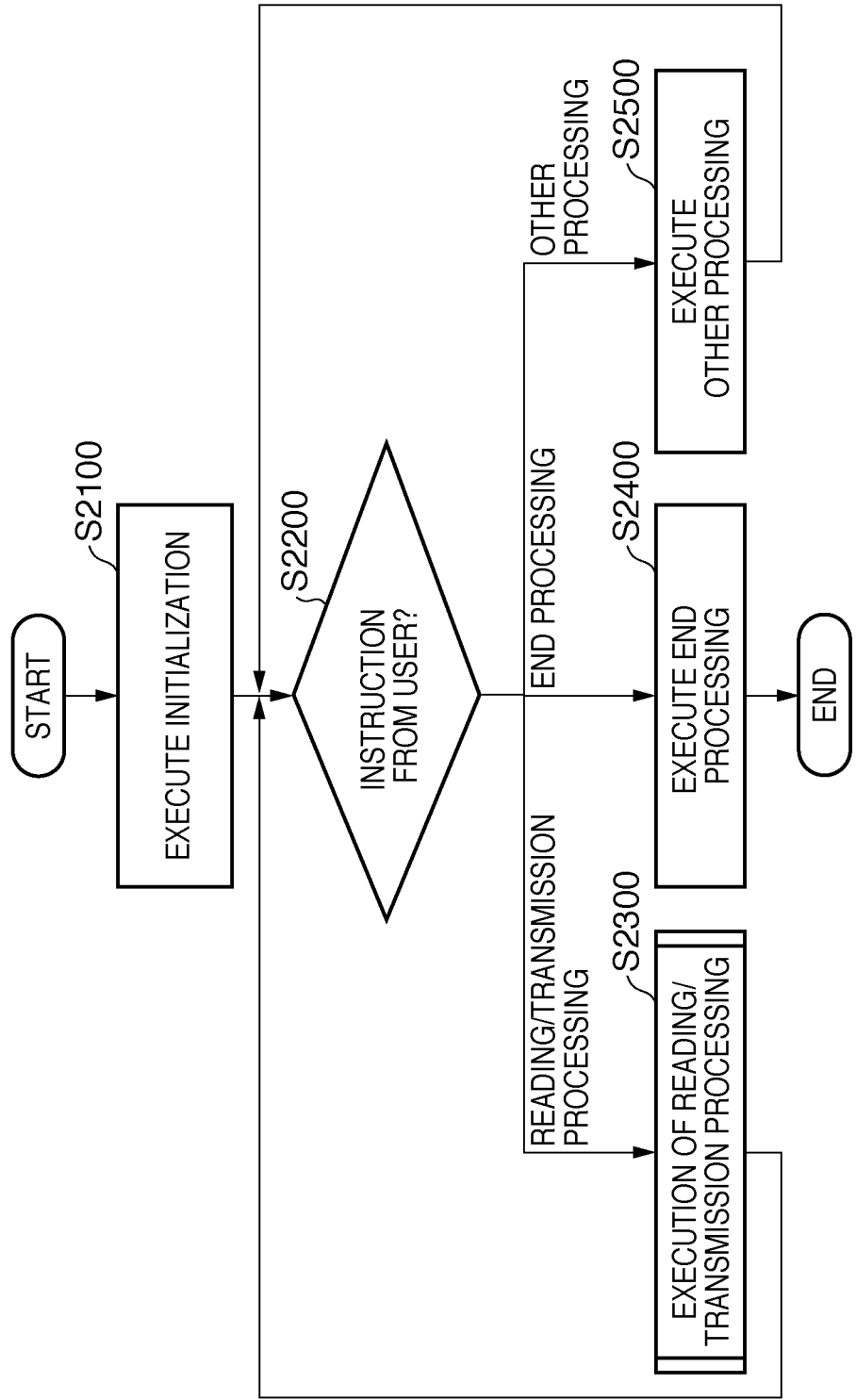
FIG. 6 is a flowchart for explaining the operation of an MFP functioning as an image reading apparatus in an embodiment of an image processing system as shown in FIG. 1.

An example of the operation of the MFP 20 functioning as an image supplying apparatus in the image processing system 1 will be explained with reference to FIG. 6. FIG. 6 is a flowchart for explaining the example of the operation of the embodiment of the MFP 20.

In step S2100, the MFP 20 is initialized.

In step S2200, the MFP 20 waits for an instruction input from the user via the UI 209. In step S2200, an instruction input from the user designates processing to be executed by the MFP 20, such as reading/transmission processing, end processing or another type of processing.

If the user designates reading/transmission processing in step S2200 (READING/TRANSMISSION PROCESSING in step S2200), the MFP 20 executes the reading/transmission processing in step S2300 to read a print document, generate image data, and transmit the image data to an image processing apparatus. Then, the MFP 20 returns to step S2200. The reading/transmission processing in step S2300 will be described in detail later.

If the user designates end processing in step S2200 (END PROCESSING in step S2200), the MFP 20 executes end processing in step S2400 to end the operation of the MFP 20.

If the user designates other processing in step S2200 (OTHER PROCESSING in step S2200), the MFP 20 executes another type of processing in step S2500, and then returns to step S2200.

Figure 7A:
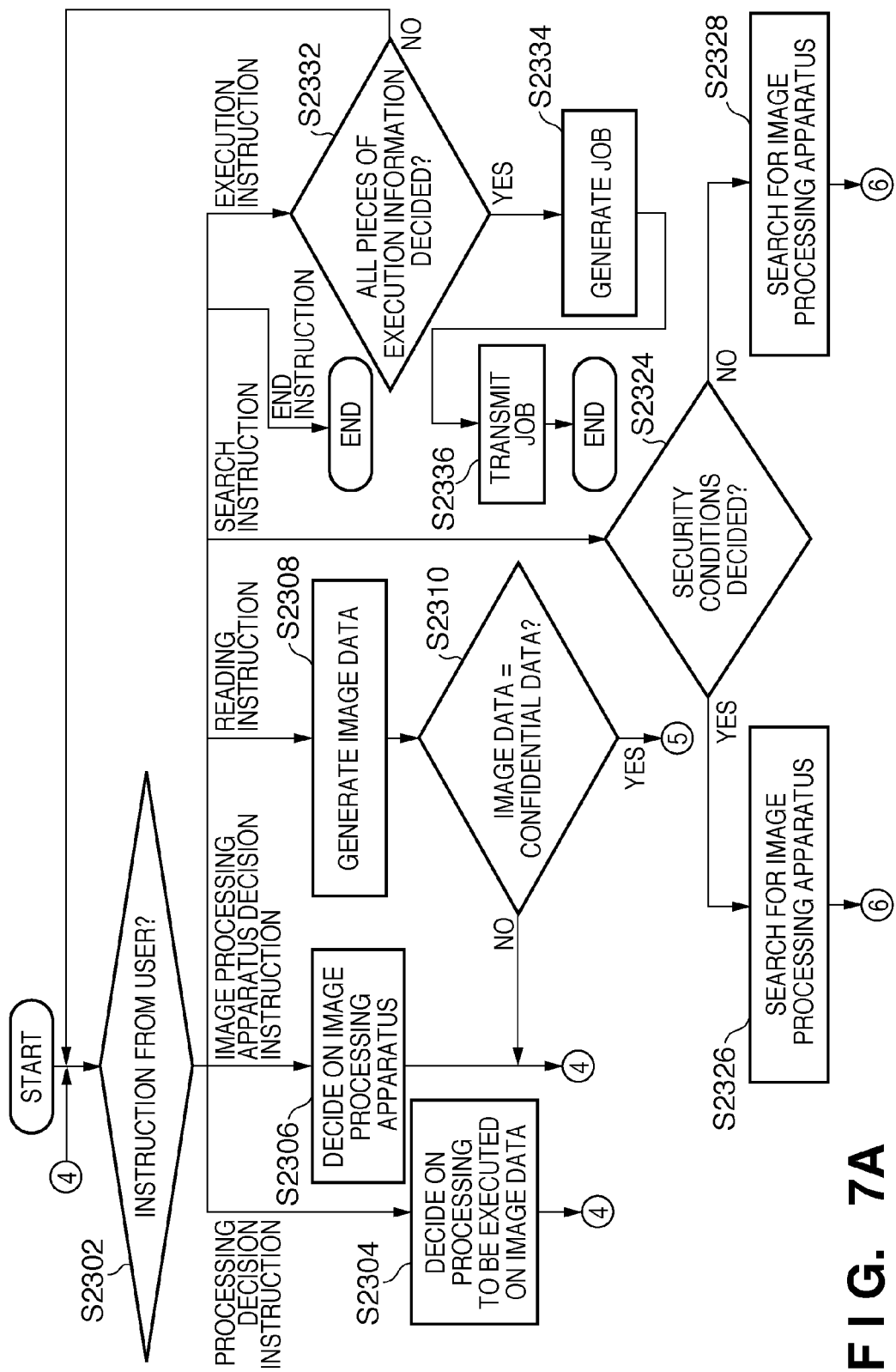
FIGS. 7A and 7B are flowcharts showing details of an embodiment of reading/transmission processing in step S2200 shown in FIG. 6.
Figure 7B:
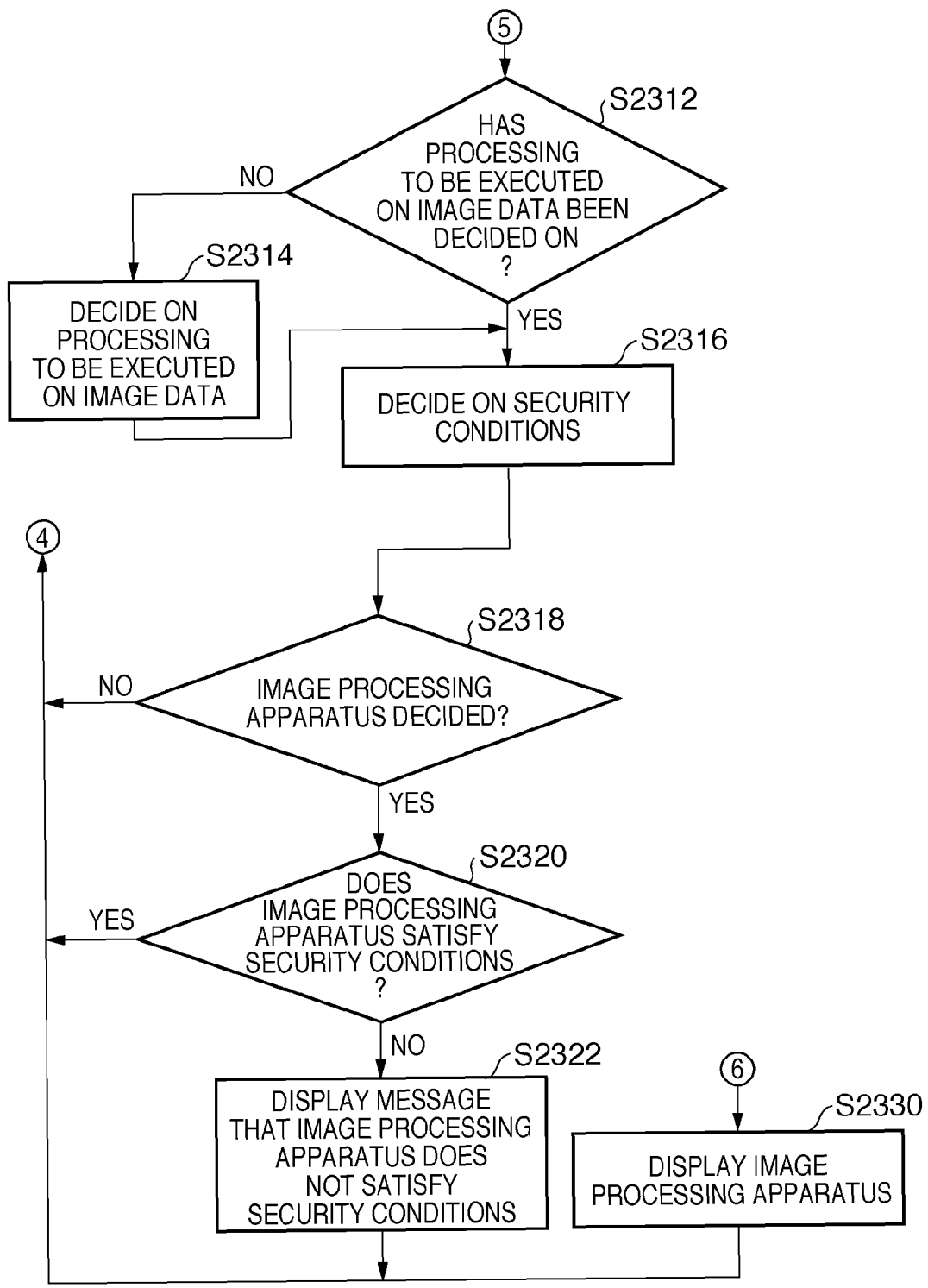

The reading/transmission processing in step S2300 will be explained with reference to FIGS. 7A and 7B. FIGS. 7A and 7B are flowcharts showing details of an example of the reading/transmission processing in step S2300.

In step S2302, the MFP 20 waits for an instruction input from the user via the UI 209. In step S2302, an instruction input from the user may be at least one of a processing decision instruction, image processing apparatus decision instruction, reading instruction, search instruction, end instruction, execution instruction, or the like.

If the user issues a processing decision instruction in step S2302 (PROCESSING DECISION INSTRUCTION IN step S2302), the MFP 20 decides in step S2304 on the processing to be executed by an image processing apparatus on image data generated by the MFP 20. After that, the MFP 20 returns to step S2302.

If the user issues an instruction in step S2302 to decide on an image processing apparatus (IMAGE PROCESSING APPARATUS DECISION INSTRUCTION in step S2302), the MFP 20 decides in step S2306 on an image processing apparatus for executing the processing decided on in step S2304 or S2314 for the image data. Then, the MFP 20 returns to step S2302.

If the user issues a reading instruction in step S2302 (READING INSTRUCTION in step S2302), the MFP 20 reads a print document to generate image data in step S2308, before proceeding to step S2310.

In step S2310, the MFP 20 determines whether the image data generated in step S2308 is confidential data (i.e., whether the image data requests security conditions).

If the MFP 20 determines that the image data generated in step S2308 is not confidential data (NO in step S2310), it returns to step S2302.

If the MFP 20 determines that the image data generated in step S2308 is confidential data (YES in step S2310), processing proceeds to step S2312, as shown in FIG. 7B, where it determines whether or not processing to be executed on the image data generated by the MFP 20 has been decided on (i.e., whether step S2304 has been executed).

If the MFP 20 determines that processing to be executed on the image data has not been decided on (NO in step S2312), processing proceeds to step S2314 where it decides on processing to be executed by an image processing apparatus on the image data generated by the MFP 20. Processing then proceeds to step S2316 to decide security conditions.

If the MFP 20 determines that processing to be executed for the image data has been decided (YES in step S2312), processing proceeds to step S2316 where it decides on security conditions for the processing decided on in step S2304 or S2314.

In step S2318, the MFP 20 determines whether an image processing apparatus for executing the processing decided on in step S2304 or S2314 has been decided on (i.e., whether step S2306 has been executed).

If the MFP 20 determines that an image processing apparatus for executing the processing of the image data has not been decided on (NO in step S2318, processing returns to step S2302.

If the MFP 20 determines that an image processing apparatus for executing the processing of the image data has been decided on (YES in step S2318), processing advances to step S2320.

In step S2320, the MFP 20 determines whether the image processing apparatus decided on in step S2306 is capable of satisfying the security conditions decided on in step S2316.

If the MFP 20 determines that the image processing apparatus satisfies the security conditions (YES in step S2320), it returns to step S2302.

If the MFP 20 determines that the image processing apparatus does not satisfy the security conditions (NO in step S2320), processing proceeds to step S2322, where it displays a message that the image processing apparatus does not satisfy the security conditions, and processing returns to step S2302.

If the user issues a search instruction in step S2302 (SEARCH INSTRUCTION in step S2302), the MFP 20 determines in step S2324 whether security conditions have been decided on (i.e., whether step S2316 has been executed).

If the MFP 20 determines that security conditions have been decided on (YES in step S2324), it searches in step S2326 the network in the image processing system 1 for an image processing apparatus which satisfies the security conditions decided on in step S2316, after which processing proceeds to step S2330 to display the image processing apparatus.

If the MFP 20 determines that no security condition has been decided (NO in step S2324), processing proceeds to step S2328, where it searches in step S2328 for an image processing apparatus on the network in the image processing system 1 regardless of whether the image processing apparatus satisfies the security conditions, after which processing proceeds to step S2330. In step S2330 the image is displayed in the processing apparatus, after which processing proceeds to step S2302.

In step S2330, the MFP 20 displays an image processing apparatus detected in one or more of step S2326 or S2328, and then returns to step S2302.

If the user issues an end instruction in step S2302 (END INSTRUCTION in step S2302), the MFP 20 ends the reading/transmission processing.

If the user issues an execution instruction in step S2302 (EXECUTION INSTRUCTION in step S2302), the MFP 20 determines in step S2332 whether all pieces of execution information for executing processing by an image processing apparatus for image data generated by the MFP 20 have been decided on. The execution information can include at least one of processing to be executed on image data, processing contents decided on to execute processing of image data, and information for specifying an image processing apparatus.

If the MFP 20 determines that not all pieces of execution information have been decided on (NO in step S2332), it returns to step S2302.

If the MFP 20 determines that all pieces of execution information have been decided on (YES in step S23320), processing proceeds to step S2334 to generate a job including the image data generated in step S2308, and processing information representing the contents of processing to be executed on the image data decided on in step S2304 or S2314.

In step S2336, the MFP 20 transmits the job generated in step S2334 to the image processing apparatus decided on in step S2306, and then ends the reading/transmission processing.

Figure 8:
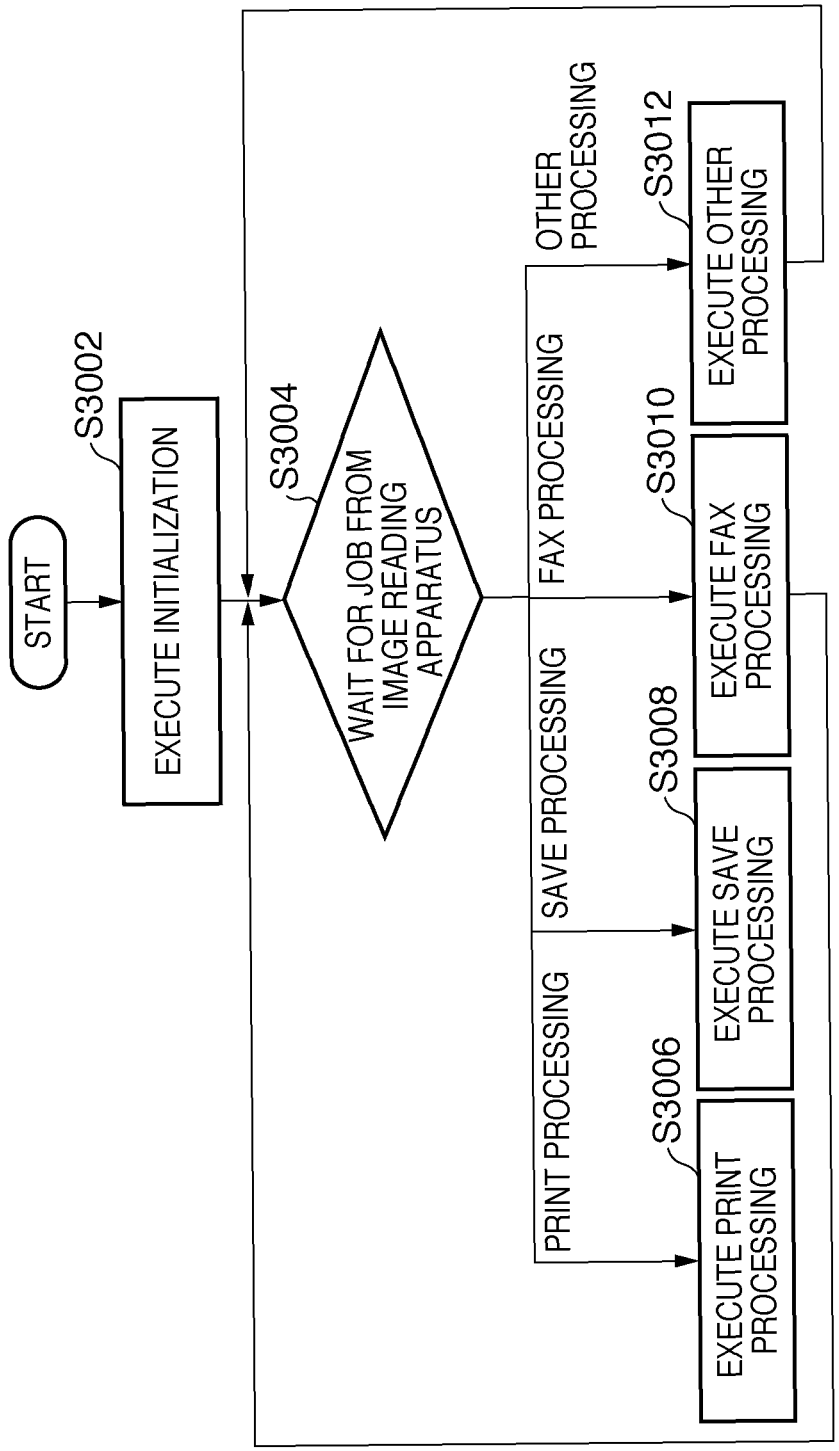
FIG. 8 is a flowchart for explaining the operation of an embodiment of a MFP functioning as an image processing apparatus in the image processing system as shown in FIG. 1.

The operation of an embodiment of the MFP 30 functioning as an image processing apparatus which processes received image data in the image processing system 1, will be explained with reference to FIG. 8. FIG. 8 is a flowchart for explaining an example of the operation of the MFP 30.

In step S3002, the MFP 30 is initialized.

In step S3004, the MFP 30 waits for a job transmitted from the MFP 20 (image supplying apparatus or image reading apparatus).

If the MFP 30 receives a job from the MFP 20 in step S3004 and processing information contained in the job that represents print processing (PRINT PROCESSING in step S3004), the MFP 30 executes print processing to print image data on printing paper in step S3006. Then, the MFP 30 returns to step S3004.

If the MFP 30 receives a job from the MFP 20 in step S3004 and processing information contained in the job that represents save processing (SAVE PROCESSING in step S3004), the MFP 30 executes save processing to save the image data in step S3008. Then, the MFP 30 returns to step S3004.

If the MFP 30 receives a job from the MFP 20 in step S3004 and processing information contained in the job that represents FAX processing (FAX PROCESSING in step S3004), the MFP 30 executes FAX processing to FAX-transmit the image data in step S3010. Then, the MFP 30 returns to step S3004. In this case, the FAX destination is designated by the user via the MFP 20, and written in processing information.

If the MFP 30 receives a job from the MFP 20 in step S3004 and processing information contained in the job represents other processing (OTHER PROCESSING in step S3004), the MFP 30 executes the other processing in step S3012, and then returns to step S3004.

Aspects according to the present invention may thus provide an image processing system capable of improving usability and reducing and even preventing leakage of information that could otherwise be caused by a human error.

In one version, one or more of the above-described embodiments can be implemented by software by the computer (or the CPU or MPU) of the system or apparatus.

According to one aspect, to implement the above-described embodiment by the computer, a computer readable storage medium storing computer-executable instructions, such as a computer program, may be supplied to the computer. In other words, a computer readable recording medium having computer executable instructions for implementing the functions of the above-described embodiment may also correspond to one aspect of the present invention.

In one version, a computer program having computer-executable instructions for implementing the above-described embodiment can take any form, as long as it is computer-readable. For example, the computer-executable instructions can be in the form of an object code, a program executed by an interpreter, script data supplied to the OS, or the like. However, the computer-readable instructions are not limited thereto.

Computer-executable instructions for implementing aspects of the above-described embodiments may be supplied to a computer by a recording medium or wired/wireless communication. Examples of the recording medium for supplying the program may be one or more of a magnetic recording medium (e.g., at least one of a flexible disk, hard disk, or magnetic tape), an optical/magnetooptical recording medium (e.g., at least one of a MO, CD, or DVD), and a nonvolatile semiconductor memory.

In one version, to provide computer-executable instructions using wired/wireless communication, a server on a computer network may be used. In this case, the server may store a data file (e.g., program file) serving as the computer program having computer-executable instructions according to aspects of the present invention. The program file may be, for example, an executable program or source code.

In another version, the server may supply the program file by downloading to a client computer that accesses the server. In this case, it may also be possible to divide the program file into a plurality of segment files, and store the segment files on different servers.

Hence, evening one version the server which provides a client computer with the program file for implementing the above-described embodiment may also constitute one aspect of the present invention.

In one version, it may also be possible to encrypt the computer program and/or computer executable instructions for implementing the above-described embodiment, distribute a recording medium which stores the encrypted instructions, supply decryption key information to a user who satisfies a predetermined condition, and permit him to install the computer program and/or computer-executable instructions in his computer. The key information can be supplied by, for example, downloading it from a homepage via the Internet.

The computer program having computer-executable instructions for implementing the above-described embodiment may also use the function of an OS running on the computer.

In another version, the computer program having the computer-executable instructions for implementing the above-described embodiment may also be partially formed from firmware such as an expansion board mounted in a computer, or executed by the CPU of the expansion board, or the like.

Figure 9:
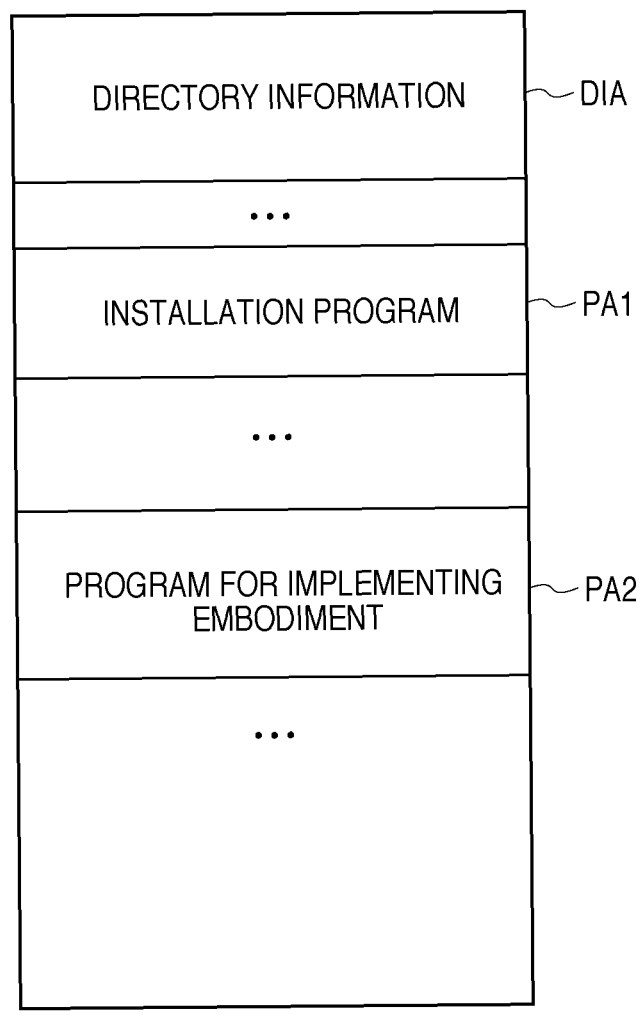
FIG. 9 is a view showing an embodiment of a memory map of a recording medium which records a computer program for implementing aspects of the invention.

FIG. 9 is a view showing the memory map of an embodiment of a recording medium which records the computer program having the computer-executable instructions for implementing the embodiment. A CD-ROM will be exemplified as an example of the recording medium.

In the version as shown, an area DIA records directory information which represents the positions of areas PA1 and PA2 (to be described later).

The area PA1 records an installation program for installing the program for implementing the embodiment.

The area PA2 records the program for implementing the embodiment.

When installing, in the MFP 20, the program for implementing the embodiment, the installation program recorded in the area PA1 may be loaded into the system and executed by the CPU 201.

Then, the installation program executed by the CPU 201 may read out the program which is recorded in the area PA2 to implement the embodiment, and the HD 211 may store the readout program.

While the present invention has been described with reference to exemplary embodiments, it is to be understood that the invention is not limited to the disclosed exemplary embodiments. The scope of the following claims is thus to be accorded the broadest interpretation so as to encompass all such modifications and equivalent structures and functions.

This application claims the benefit of Japanese Patent Application No. 2008-045099 filed on Feb. 26, 2008, which is hereby incorporated by reference herein in its entirety.

What is claimed is:

1. An image processing system in which an image supplying apparatus is connected to a plurality of image processing apparatuses via a network, and at least one image processing apparatus among the plurality of image processing apparatuses executes processing requested by a user for image data supplied from the image supplying apparatus, the image supplying apparatus comprising:

a determination unit configured to determine, when image data to be processed by any one of the plurality of image processing apparatuses includes confidential data, a security condition based on a type of the processing requested by the user;

a search unit configured to search the plurality of image processing apparatuses connected to the network for an image processing apparatus which is capable of executing the processing requested by the user and satisfies the security condition determined by the determination unit;

a display unit configured to display the image processing apparatus from the result of the search by the search unit so as to allow the user to select the image processing apparatus; and a transmission unit configured to transmit the image data to the image processing apparatus which is displayed on the display unit and is selected by the user.

2. The system according to claim 1, wherein the image supplying apparatus further comprises a storage unit configured to store a table representing a relationship between processing executed by the image processing apparatus for the image data and the security condition for the processing, wherein the determination unit determines the security condition based on the type of the processing requested by the user and the table stored in the storage unit.

3. The system according to claim 1, wherein, when the image data does not include the confidential data, the search unit searches the plurality of image processing apparatuses connected to the network for an image processing apparatus that is capable of executing the processing requested by the user.

4. The system according to claim 1, wherein, when the search unit cannot search an image processing apparatus that is capable of executing the processing requested by the user and that satisfies the security condition determined by the determination unit, the display unit displays a message that the image processing apparatus cannot be searched.

5. A control method for an image processing system in which an image supplying apparatus is connected to a plurality of image processing apparatuses via a network, and at least one image processing apparatus among the plurality of image processing apparatuses executes processing requested by a user for image data supplied from the image supplying apparatus, the method comprising:

determining, when image data to be processed by any one of the plurality of image processing apparatuses includes confidential data, a security condition based on a type of the processing requested by the user searching the plurality of image processing apparatuses connected to the network for an image processing apparatus that is capable of executing the processing requested by the user and satisfies the determined security condition;

displaying the image processing apparatus from the search result while searching so as to allow the user to select the image processing apparatus; and transmitting the image data to the image processing apparatus which is displayed and is selected by the user.

6. A control method for an image processing system in which an image supplying apparatus is connected to a plurality of image processing apparatuses via a network, and at least one image processing apparatus among the plurality of image processing apparatuses executes processing requested by a user for image data supplied from the image supplying apparatus, the method comprising:

searching the plurality of image processing apparatuses connected to the network for an image processing apparatus that is capable of executing the processing requested by the user;

deciding on, from among the searched plurality of image processing apparatuses, an image processing apparatus for executing the processing requested by the user;

determining, after deciding on the image processing apparatus for executing the processing requested by the user, whether the image data includes confidential data;

determining, when the image data includes the confidential data, a security condition based on a type of the processing requested by the user;

determining whether the image processing apparatus decided on for executing the processing requested by the user satisfies the determined security condition; and transmitting the image data to the image processing apparatus decided on for executing the processing requested by the user when the image processing apparatus is determined to satisfy the determined security condition.

7. The method according to claim 6, further comprising, when the image processing apparatus decided on for executing the processing requested by the user is determined not to satisfy the determined security condition, displaying a message that the image processing apparatus decided on for executing the processing requested by the user does not satisfy the determined security condition.

8. The method according to claim 6, further comprising, when the image processing apparatus decided on for executing the processing requested by the user is determined not to satisfy the determined security condition, searching again the plurality of image processing apparatuses connected to the network for an image processing apparatus which satisfies the determined security condition.

9. A non-transitory computer-readable recording medium containing computer-executable instructions for controlling an image processing system in which an image supplying apparatus is connected to a plurality of image processing apparatuses via a network, and at least one image processing apparatus among the plurality of image processing apparatuses executes processing requested by a user for image data supplied from the image supplying apparatus, the computer readable medium comprising:

computer-executable instructions for determining, when image data to be processed by any one of the plurality of image processing apparatuses includes confidential data, a security condition based on a type of the processing requested by the user;

computer-executable instructions for searching the plurality of image processing apparatuses connected to the network for an image processing apparatus that is capable of executing the processing requested by the user and satisfies the determined security condition;

computer-executable instructions for displaying the image processing apparatus from the search result while searching so as to allow the user to select the image processing apparatus; and computer-executable instructions for transmitting the image data to the image processing apparatus which is displayed and is selected by the user.

10. A non-transitory computer-readable recording medium containing computer-executable instructions for controlling an image processing system in which an image supplying apparatus is connected to a plurality of image processing apparatuses via a network, and at least one image processing apparatus among the plurality of image processing apparatuses executes processing requested by a user for image data supplied from the image supplying apparatus, the computer-readable recording medium comprising:

computer-executable instructions for searching the plurality of image processing apparatuses connected to the network for an image processing apparatus that is capable of executing the processing requested by the user;

computer-executable instructions for deciding on, from among the searched plurality of image processing apparatuses, an image processing apparatus for executing the processing requested by the user;

computer-executable instructions for determining, after deciding on the image processing apparatus for executing the processing requested by the user, whether the image data includes confidential data;

computer-executable instructions for determining, when the image data includes the confidential data, a security condition based on a type of the processing requested by the user;

computer-executable instructions for determining whether the image processing apparatus decided on for executing the processing requested by the user satisfies the determined security condition; and computer-executable instructions for transmitting the image data to the image processing apparatus decided on for executing the processing requested by the user when the image processing apparatus decided on for executing the processing requested by the user is determined to satisfy the determined security condition.

11. An image supplying apparatus which is connected to a plurality of image processing apparatuses via a network, and causes at least one image processing apparatus among the plurality of image processing apparatuses to execute processing requested by a user for supplied image data, the image supplying apparatus comprising:

a determination unit configured to determine, when image data to be processed by any one of the plurality of image processing apparatuses includes confidential data, a security condition based on a type of the processing requested by the user;

a search unit configured to search the plurality of image processing apparatuses connected to the network for an image processing apparatus that is capable of executing the processing requested by the user and satisfies the security condition determined by the determination unit;

a display unit configured to display the image processing apparatus searched by the search unit so as to allow the user to select the image processing apparatus; and a transmission unit configured to transmit the image data to the image processing apparatus which is displayed on the display unit and is selected by the user.

12. The system according to claim 1, wherein the type of the processing requested by the user includes at least one of print processing, FAX processing, and save processing.

\* \* \* \* \*